(12) United States Patent
Wakiwaka et al.

(10) Patent No.: US 10,697,842 B2
(45) Date of Patent: Jun. 30, 2020

(54) MAGNETOSTRICTION TYPE TORQUE DETECTION SENSOR

(71) Applicant: SHINANO KENSHI KABUSHIKI KAISHA, Nagano (JP)

(72) Inventors: Hiroyuki Wakiwaka, Nagano (JP); Akihide Furukawa, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 25 days.

(21) Appl. No.: 16/113,511

(22) Filed: Aug. 27, 2018

(65) Prior Publication Data

US 2019/0107449 A1    Apr. 11, 2019

(30) Foreign Application Priority Data

Oct. 11, 2017  (JP) ................. 2017-197706

(51) Int. Cl.
| | | |
|---|---|---|
| *G01L 3/00* | (2006.01) | |
| *G01L 3/10* | (2006.01) | |
| *H01F 27/245* | (2006.01) | |
| *H01F 27/26* | (2006.01) | |

(52) U.S. Cl.
CPC .............. *G01L 3/102* (2013.01); *G01L 3/103* (2013.01); *H01F 27/2455* (2013.01); *H01F 27/266* (2013.01)

(58) Field of Classification Search
CPC ..... G01L 3/102; G01L 3/103; H01F 27/2455; H01F 27/266
USPC .................................................... 73/862.335
See application file for complete search history.

(56) References Cited

U.S. PATENT DOCUMENTS

| | | | | | |
|---|---|---|---|---|---|
| 5,280,729 | A | * | 1/1994 | Aoki ....................... | G01L 3/102 73/862.333 |
| 5,589,645 | A | * | 12/1996 | Kobayashi .............. | G01L 3/102 324/209 |
| 5,816,599 | A | * | 10/1998 | Soejima .................. | B62M 1/36 280/259 |
| 5,850,045 | A | * | 12/1998 | Harada .................. | G01L 3/102 73/862.333 |

(Continued)

FOREIGN PATENT DOCUMENTS

| | | |
|---|---|---|
| JP | 2005-321272 | 11/2005 |
| JP | 5683001 | 3/2015 |

OTHER PUBLICATIONS

European Search Report dated Mar. 14, 2019 in European Application No. 18191760.0.

*Primary Examiner* — Max H Noori
(74) *Attorney, Agent, or Firm* — Stephen J. Weyer, Esq.; Stites & Harbinson, PLLC

(57) ABSTRACT

There is provided a magnetostriction type torque detection sensor which is improved in torque detection sensitivity by increasing respective magnetic paths which are formed between a detected object and a plurality of cores attached to an insulating tubular body in such a manner that a magnetic path which is formed at the detected object is at a predetermined angle to an axis of the detected object.
A plurality of cores is arrayed while being inclined at a predetermined angle to an axis of a detected object, and end surfaces of two-side leg portions are attached in such a way as to face the detected object via an inner circumferential surface of an insulating tubular body.

3 Claims, 4 Drawing Sheets

(56) References Cited

U.S. PATENT DOCUMENTS

| | | | | |
|---|---|---|---|---|
| 6,412,356 | B1* | 7/2002 | Kouketsu | G01L 3/102 |
| | | | | 73/862.193 |
| 9,983,075 | B2* | 5/2018 | Nakamura | G01L 3/102 |
| 2005/0160835 | A1* | 7/2005 | Masaki | G01L 3/102 |
| | | | | 73/862.333 |
| 2005/0204830 | A1* | 9/2005 | Kuroda | G01L 3/102 |
| | | | | 73/862.331 |
| 2016/0305833 | A1 | 10/2016 | Nakamura | |
| 2018/0067007 | A1* | 3/2018 | Shimizu | G01L 3/102 |

* cited by examiner

MAGNETOSTRICTION TYPE TORQUE DETECTION SENSOR

CROSS-REFERENCE TO RELATED APPLICATION

This application is based upon and claims the benefit of priority of the prior Japanese Patent Application No. 2017-197706, filed on Oct. 11, 2017, and the entire contents of which are incorporated herein by reference.

TECHNICAL FIELD

The present invention relates to a magnetostriction type torque detection sensor.

BACKGROUND ART

A method of detecting a torque acting on a detected object such as a rotation shaft in a non-contact manner includes using a torque detection device of the magnetostriction type. In the torque detection device, a pair of coils is wound around the detected object in a non-contact manner, and a pair of cores of the claw-pole type surrounding the inner and outer circumferences of them is concentrically provided without contacting the detected object. Each core is attached in such a manner that a pair of ring portions provided with pole teeth on the inner circumferential side at both ends of a tubular portion faces the detected object with the pole teeth arranged in a mutually meshing manner. The cores, each of which forms a magnetic path in conjunction with the detected object, are arranged symmetrically with respect to a line segment perpendicular to the axis of the detected object. A magnetic flux which is generated by energization of each coil causes a magnetic path to be formed by the core and the detected object.

A case where a torque has acted on a detected object is described. Depending on directions of a torque acting on the detected object, a compressive stress acts in a direction of +45° relative to the axis of the detected object and a tensile stress acts in a direction of −45° relative thereto, or a tensile stress acts in a direction of +45° relative thereto and a compressive stress acts in a direction of −45° relative thereto. Since a magnetic flux passes through the detected object in a direction inclined relative to the axis thereof, the magnetic flux passes therethrough in such a way as to travel along the direction of a tensile stress or compressive stress acting on the detected object. The relative magnetic permeability of the detected object varying causes a change in inductance of a pair of coils. Converting such a change in inductance of a pair of coils into a torque enables detecting a torque acting on the detected object. Moreover, as illustrated in FIG. 4, making clearances between teeth 101 and teeth 102, which mesh with each other along the vertical direction in the claw-pole type structure, different as clearances C1 and C2 enables setting the direction of a magnetic flux passing through the detected object to an intended direction (see PTL 1: Japanese Patent No. 5,683,001).

SUMMARY OF INVENTION

Technical Problem

However, in the above-mentioned detection device disclosed in PTL 1, a magnetic flux having a direction different from the magnetic flux having an intended direction would also be formed albeit slightly, so that the magnetic fluxes may cancel out each other, thus reducing the detection sensitivity.

Moreover, there is also a need to further improve the detection sensitivity by further increasing magnetic fluxes having an intended direction.

Solution to Problem

The present invention has been accomplished to solve these problems, and an object thereof is to provide a magnetostriction type torque detection sensor which is improved in torque detection sensitivity by increasing respective magnetic paths which are formed between a detected object and a plurality of cores attached to an insulating tubular body in such a manner that a magnetic path which is formed at the detected object is at a predetermined angle to an axis of the detected object.

The present invention has the following configuration to attain the above object.

A magnetostriction type torque detection sensor includes an insulating tubular body concentrically attached in such a way as to cover an outer circumference of a detected object, a plurality of detection coils wound along a groove provided on a circumferential surface of the insulating tubular body, and a plurality of cores attached to the insulating tubular body in such a manner that each of the plurality of detection coils passes through a U-shaped space portion surrounded by a bridging portion connecting two-side leg portions, wherein the plurality of cores is arrayed while being inclined at a predetermined angle to an axis of the detected object and is attached in such a manner that end surfaces of the two-side leg portions face the detected object via an inner circumferential surface of the insulating tubular body.

According to the above magnetostriction type torque detection sensor, the plurality of cores is arrayed while being inclined at a predetermined angle to an axis of the detected object and is attached in such a manner that end surfaces of the two-side leg portions face the detected object via an inner circumferential surface of the insulating tubular body. Moreover, since the core, which is formed in a U-shape, is arrayed while being inclined at a predetermined angle to the axis of the detected object, an independent magnetic path which passes through one leg portion (end surface)—the detected object—the other leg portion (end surface)—the bridging portion is formed. A magnetic flux can be more concentrated as compared with a case in which there is no core, and the magnetic flux can be almost limited to the above-mentioned route. Since the absolute amount of magnetic flux effective for detection of a torque can be increased, the detection sensitivity for a torque acting on the detected object is improved. In particular, since cores each of which is formed in a U-shape can be stacked in a plurality of steps, the amount of magnetic flux having an intended direction can be secured to a larger extent. Moreover, with regard to a magnetic path passing through one leg portion to an adjacent leg portion at the same side, which is an unintended magnetic path, since the same coil extends over a plurality of cores, the same magnetic field is generated around the coil and, therefore, the same polarity occurs, so that such an unintended magnetic path is not formed. Furthermore, as mentioned above, since a magnetic flux is concentrated on a core, a structure in which a magnetic path connecting adjacent cores is unlikely to be formed is employed. Therefore, this structure is formed as a structure enabling obtaining a larger number of intended magnetic paths. Accordingly, this structure further contributes to an improvement in torque detection sensitivity.

It is desirable that the plurality of cores be attached to the insulating tubular body in such a manner that a magnetic path which is formed at the plurality of cores and the detected object is at an inclination angle of any one of ±45° to the axis of the detected object.

With this, in a case where a torque is applied to the axis of the detected object, a compressive stress acts in a direction of +45° and a tensile stress acts in a direction of −45°, or a tensile stress acts in a direction of +45° and a compressive stress acts in a direction of −45° relative thereto. In that case, since, as mentioned above, the plurality of cores is attached to the insulating tubular body in such a manner that the formed magnetic path is at an inclination angle of any one of ±45° to the axis of the detected object, a change in magnetic permeability occurring in the detected object can be detected to a maximum extent by performing conversion from the amount of change in inductance of the detection coils to a torque.

Moreover, a first insulating tubular body to which the plurality of cores is attached in such a manner that a magnetic path which is formed at the detected object is formed at an inclination angle of +45° to the axis of the detected object and a second insulating tubular body to which the plurality of cores is attached in such a manner that a magnetic path which is formed at the detected object is formed at an inclination angle of −45° to the axis of the detected object can be located close to each other in an axial direction.

With this, a change in torque in any rotation direction acting on the detected object can be detected with a high sensitivity.

Advantageous Effects of Invention

A magnetostriction type torque detection sensor which is capable of increasing the amount of magnetic flux of a magnetic path having an intended direction formed between a detected object and a plurality of cores attached to an insulating tubular body at a predetermined angle to an axis of the detected object and which is improved in torque detection sensitivity by reducing the amount of canceling out with a magnetic flux advancing in an unintended direction can be provided. Moreover, an improvement in torque detection sensitivity makes it unnecessary to perform processing on a shaft itself, the presence of a plurality of cores enables averaging, with the number of cores, variations caused by, for example, material unevenness of the shaft surface or eccentricity in the process of rotation, thus stably performing torque detection, and costs required for, for example, accurate quality and management of parts can be reduced.

DESCRIPTION OF EMBODIMENTS

Hereinafter, a magnetostriction type torque detection sensor according to an embodiment of the present invention will be described with reference to the accompanying drawings. First, an outline configuration of the magnetostriction type torque detection sensor is described with reference to FIGS. 1A and 1B.

It is desirable that, for example, a detected object S be made from a material that is high in inverse magnetostriction effect. For example, the material that is high in inverse magnetostrictive effect includes permendur, Alfer (Fe—Al), permalloy (Fe-Nix), and spheroidal graphite cast iron (JIS FCD70). Furthermore, the inverse magnetostrictive effect is a phenomenon in which, when a stress is externally applied to a magnetic material, the magnetic property thereof changes. Moreover, if the detected object S is previously subjected to magnetic annealing as needed, a torque acting on the detected object S can be appropriately detected, although details thereof are described below. Moreover, even if a non-magnetic material is used, performing coating with a metallic magnetic material by, for example, thermal spraying or performing press fitting of a magnetic cylinder as a shaft enables torque detection. Furthermore, the detected object S illustrated in FIGS. 1A and 1B as an example is column-shaped, but is not limited to this. As long as the outer shape of the detected object S is column-shaped, the internal structure thereof is not considered. For example, a columnar shape in which the inner diameter is constant with respect to the axial direction or a columnar shape in which the inner diameter is varied with respect to positions in the axial direction can also be employed. Moreover, the detected object S can be the one scheduled to be rotated or can be the one not scheduled to be rotated.

Figure 1A:
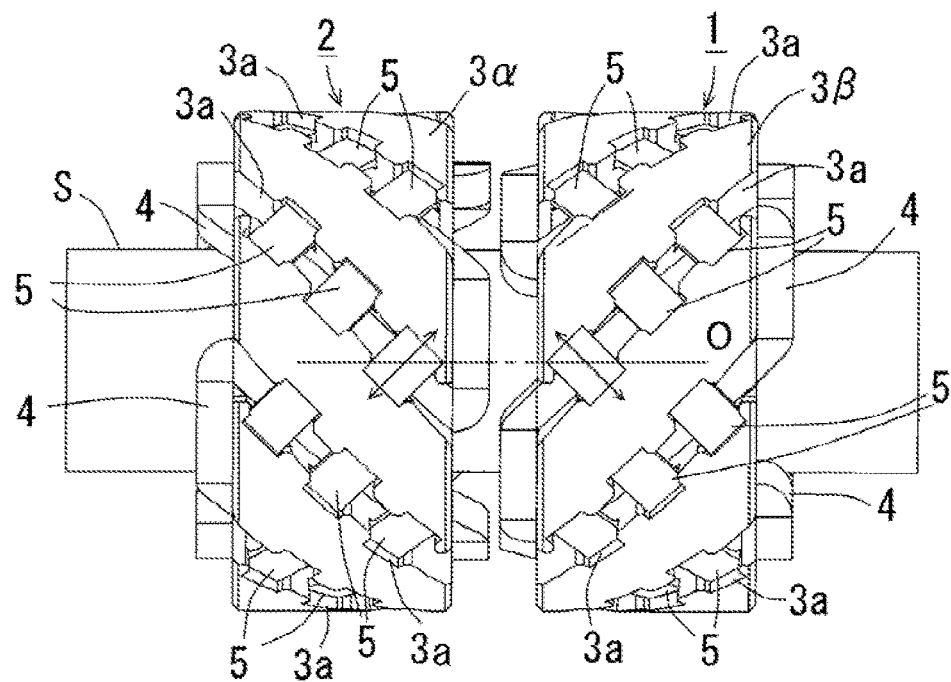
FIGS. 1A and 1B are a front view and a perspective view of a magnetostriction type torque detection sensor.
Figure 1B:
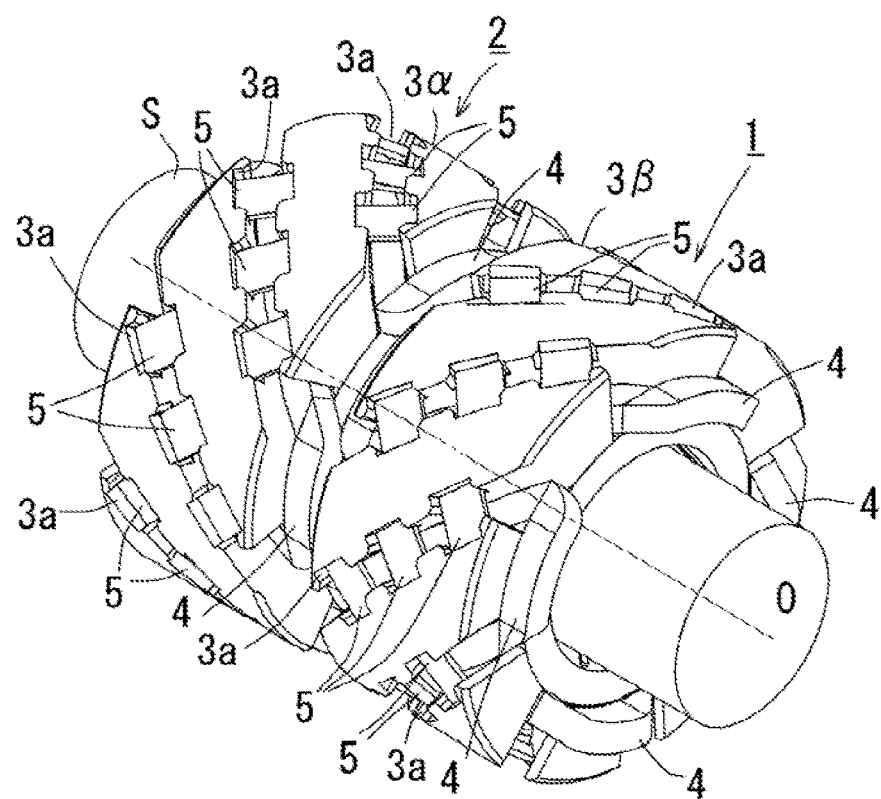

As illustrated in FIGS. 1A and 1B, a pair of magnetostriction type torque detection sensors 1, 2 is concentrically attached while covering the outer circumference of the detected object S. A first insulating tubular body 3α and a second insulating tubular body 3β (insulators), each of which is made from resin, are concentrically attached while covering the outer circumference of the detected object S. A groove 3a inclined in an oblique direction is drilled at a plurality of places on the circumferential surface of each insulating tubular body 3. Each detection coil 4 is buried in a pair of such grooves 3a, and is wound in such a way as to extend between and circle around the grooves 3a at the end portions of the first and second insulating tubular bodies 3α, 3β (see FIG. 1B and FIG. 3B). On the circumferences of the first and second insulating tubular bodies 3α, 3β, a plurality of detection coils 4 is wound in such a way as to pass through the inside of adjacent grooves 3a and circle therearound.

Figure 2A:
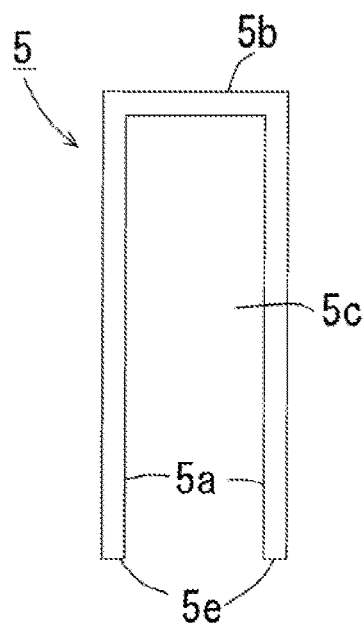
FIGS. 2A, 2B, 2C, and 2D are front views and perspective views illustrating shapes of cores.
Figure 2B:
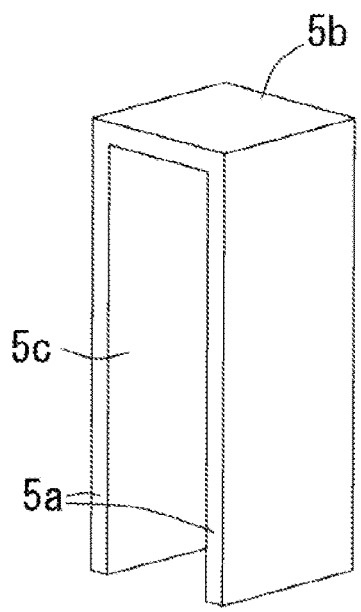

A plurality of cores 5 each formed in a U-shape is attached at regular intervals along each groove 3a formed in the first and second insulating tubular bodies 3α, 3β. As illustrated in FIGS. 2A and 2B, each core 5 is attached to the first and second insulating tubular bodies 3α, 3β in such a manner that the detection coil 4 passes through a U-shaped space portion 5c surrounded by a bridging portion 5b connecting two-side leg portions 5a (see FIGS. 1A and 1B).

Figure 3A:
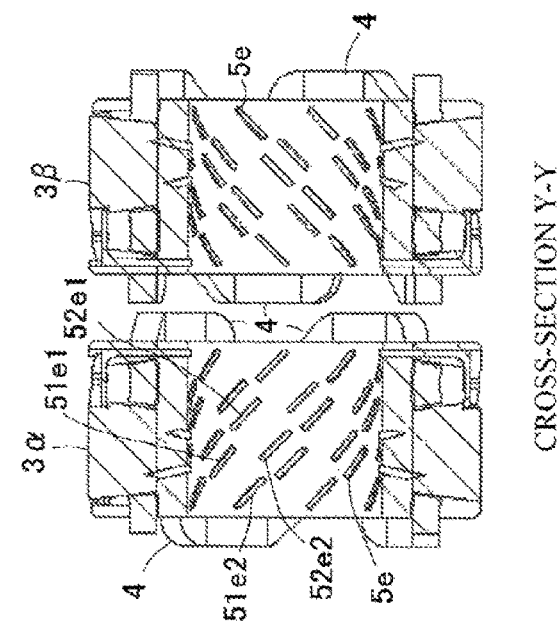
FIGS. 3A, 3B, and 3C are a front view, an axial side view, and a sectional view taken along line Y-Y of first and second insulating tubular bodies.
Figure 3B:
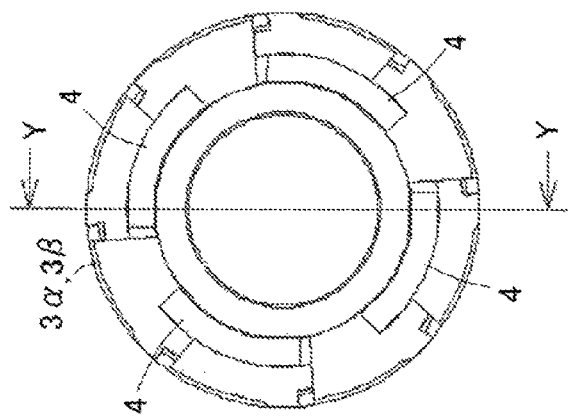
Figure 3C:
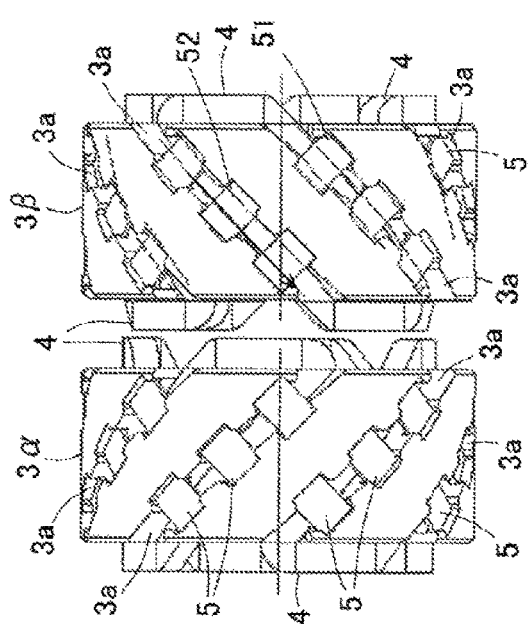
Figure 4:
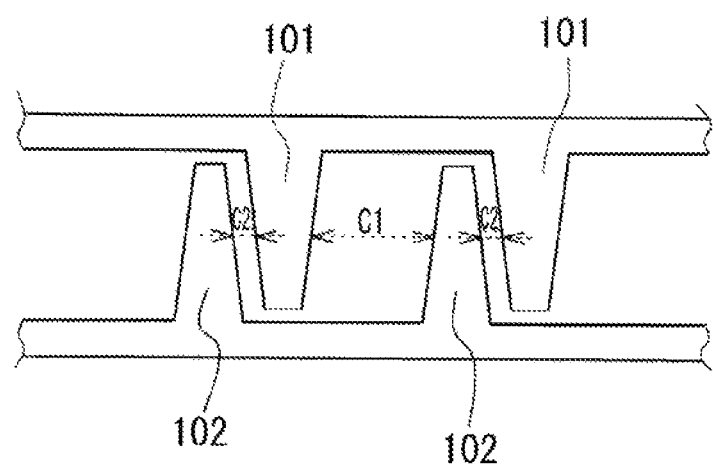
FIG. 4 is an explanatory diagram of a core of a conventional magnetostriction type torque detection device.

As illustrated in FIG. 3A, the plurality of cores 5 is attached to the groove 3a while being inclined at a predetermined angle with respect to an axis O of the detected object S in such a manner that the two-side leg portions 5a are inserted toward the inside in the radial direction of the first and second insulating tubular bodies 3α, 3β while the bridging portion 5b intersects with the detection coil 4. As illustrated in FIG. 3C, leg portion end surfaces 5e of the two-side leg portions 5a of the core 5 are formed in such an exposed manner as to face the detected object S via the inner circumferential surface of the insulating tubular body 3. Here, leg portion end surfaces 51e1 and 51e2 are end surfaces of the two-side leg portions 5a of a core 51 illustrated in FIG. 3A, and leg portion end surfaces 52e1 and 52e2 are end surfaces of the two-side leg portions 5a of another core 52 illustrated therein.

Furthermore, in the present embodiment, the leg portion end surfaces 5e are formed in such an exposed manner as to face the detected object S, but do not necessarily need to be exposed, and the leg portion end surfaces 5e can be covered with the insulating tubular body 3 depending on the intended use of the magnetostriction type torque detection sensor.

Moreover, as illustrated in FIG. 1A, each core 5 is attached to the first and second insulating tubular bodies 3α, 3β in such a manner that a magnetic path which is formed at the detected object S is at an inclination angle of any one of ±45° to the axis O of the detected object S. With this, in a case where a compressive stress acts in a direction of +45° to the axis O of the detected object S and a tensile stress acts in a direction of −45° thereto, or a tensile stress acts in a direction of +45° thereto and a compressive stress acts in a direction of −45° thereto, a change in magnetic permeability occurring in the detected object S by the above-mentioned inverse magnetostrictive effect can be detected by performing conversion from the amount of change in inductance of the detection coils 4 to a torque.

In the present embodiment, the first insulating tubular body 3α (the left side in FIG. 1A), to which the plurality of cores 5 is attached in such a manner that a magnetic path (arrows in FIG. 1A) which is formed at the detected object S is formed at an inclination angle of +45° to the axis O of the detected object S and the second insulating tubular body 3β (the right side in FIG. 1A), to which the plurality of cores 5 is attached in such a manner that a magnetic path (arrows in FIG. 1A) which is formed at the detected object S is formed at an inclination angle of −45° to the axis O of the detected object S are located close to each other in the axial direction.

With this, a change in torque in any rotation direction acting on the detected object S can be detected with a high sensitivity.

Figure 2C:
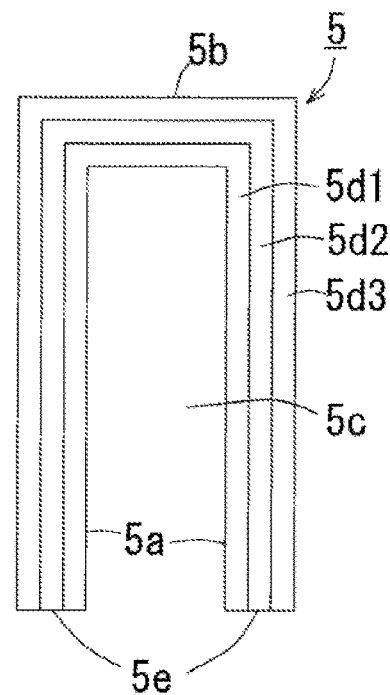
Figure 2D:
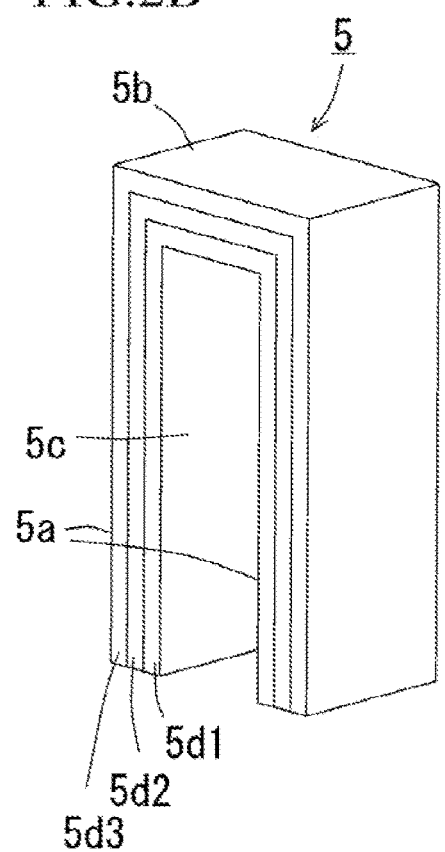

It is desirable that the core 5 be made by folding a magnetic plate material into a U-shape, as illustrated in FIGS. 2A and 2B. It is favorable that the magnetic plate material is a soft magnetic material, for which, for example, a silicon steel plate or a pure iron, which is relatively high in magnetic permeability, is used. The core 5 can be a magnetic nanowire. For example, since nanowires made of amorphous alloy (metallic glass) exist, a fiber obtained by bundling these wires can also be used. Moreover, the core 5 can be configured with ferrite. The core 5 has the two-side leg portions 5a and the bridging portion 5b connecting the two-side leg portions 5a, and is attached to the first and second insulating tubular bodies 3α, 3β in such a manner that the detection coil 4 passes through the U-shaped space portion 5c surrounded by the bridging portion 5b and the two-side leg portions 5a. Moreover, the core 5 can be a single plate as illustrated in FIGS. 2A and 2B, or each core 5 can be formed by stacking a plurality of U-shaped magnetic plate materials 5d1 to 5d3 having respective different sizes (similar shapes) as illustrated in FIGS. 2C and 2D. With this, since a magnetic path which passes through the core 5 can be secured to a large extent, a contribution to an improvement in torque detection sensitivity is attained.

Here, the principle of detection of a torque acting on the detected object S is described. When a torque occurs at the detected object S, a magnetic permeability µ of the detected object S is changed by the inverse magnetostrictive effect, and, as a result, such a change can be measured as a change in inductance of the detection coil 4. More specifically, the inductance of the detection coil 4 is proportional to the square of the number of turns N of the detection coil 4, and is inversely proportional to a magnetic resistance Rm including a magnetic path of the core 5 and the detected object S, which are configured in such a way as to insert the detection coil 4 therebetween. The magnetic resistance Rm is inversely proportional to a cross-sectional area A of a magnetic path through which a magnetic flux flows and a relative magnetic permeability µr and is proportional to a length L of the magnetic path through which a magnetic flux flows. Moreover, increasing the amount of magnetic flux having an intended direction enables acquiring a change in the magnetic permeability µ in a sensitive manner. When a compressive force is applied from the core 5, which determines the inductance of the detection coil 4, to the detected object S in the same direction as that of a magnetic flux flowing thereinto, the value of the magnetic permeability µ of the detected object S decreases, and, as a result, the inductance of the detection coil 4 decreases. Conversely, when a tensile force acts in the same direction as that of the flow of the magnetic flux, the inductance of the detection coil 4 increases.

For example, in FIGS. 1A and 1B, when a tensile force acts on the detected object S in a direction of +45°, the inductance of the detection coil 4 increases, and, when a compressive force acts thereon in a direction of −45°, the inductance of the detection coil 4 decreases. Such a change in inductance is detected as a change in output voltage by a phase detection method using a lock-in amplifier, and a torque acting on the detected object S is detected based on the amount of change between an output voltage value obtained when a torque is acting on the detected object S and an output voltage value obtained when no torque is acting thereon.

Moreover, in the present invention, as illustrated in FIG. 3A, for example, a plurality of cores 51, 52 is attached to the insulating tubular body 3 in such a manner that a single detection coil 4 passes through each U-shaped space portion 5c (see FIGS. 2A to 2D). In that case, when a current is flowing through the detection coil 4 in the direction of an arrow illustrated in FIG. 3A, a magnetic path passing through one leg portion end surface 51e1—the detected object S—the other leg portion end surface 51e2—the bridging portion 5b (see FIGS. 2A to 2D) is formed in the core 51 illustrated in FIG. 3C. Similarly, in the core 52, a magnetic path passing through one leg portion end surface 52e1—the detected object S—the other leg portion end surface 52e2—the bridging portion 5b (see FIGS. 2A to 2D) is formed. Since the magnetic paths are generated by a single detection coil 4, the leg portion end surfaces 51e1 and 52e1 at one side of the cores 51, 52 become having magnetically the same polarity, thus exhibiting a property of magnetically repelling each other. Similarly, the leg portion end surfaces 51e2 and 52e2 at the other side thereof also become having magnetically the same polarity, thus exhibiting a property of magnetically repelling each other.

Here, as a contradistinction, a case where a plurality of detection coils 4 passes through the U-shaped space portion 5c (see FIGS. 2A to 2D) of the cores 51, 52 and a current in the reverse direction is flowing through each detection coil 4 is described. In this case, unlike the present embodiment, the leg portion end surfaces 51e1 and 52e1 become having magnetically different polarities, thus exhibiting a property of attracting each other. Similarly, the leg portion end surfaces 51e2 and 52e2 at the other side also attract each other. Usually, since, as the distance between cores is shorter and the cores have different polarities, a magnetic path is more likely to be formed, a magnetic path would be formed between the leg portion end surface 51e1 and the leg portion end surface 52e1 and between the leg portion end surface 51e2 and the leg portion end surface 52e2. However, these magnetic paths are different from an intended magnetic path, which is at an inclination angle of any one of ±45° to the axis O of the detected object S, and, therefore, would decrease the accuracy of torque detection.

On the other hand, as in the present embodiment, since each of a pair of the leg portion end surfaces 51e1 and 52e1 and a pair of the leg portion end surfaces 51e2 and 52e2 becomes having magnetically the same polarity and repels each other, a magnetic path is not formed, and, therefore, as a result, the formation of a magnetic path concentrates on between the leg portion end surfaces 51e1 and 51e2 and between the leg portion end surfaces 52e1 and 52e2. Accordingly, since a smaller number of magnetic paths ineffective for torque detection are formed and a larger number of magnetic paths effective for torque detection are formed, the torque detection accuracy can be increased.

As described above, a plurality of cores 5 each formed in a U-shape is arrayed while being inclined at a predetermined angle to the axis O of the detected object S, and an independent magnetic path is formed at a plurality of places around the detected object S. Therefore, the sensitivity of detection of a torque acting on the detected object S is improved. In particular, since the cores 5 each of which is formed in a U-shape can be stacked in a plurality of steps, magnetic paths can be secured to a large extent, so that this structure can contribute to an improvement in torque detection sensitivity. Moreover, since a magnetic path which is formed between each core 5 and the detected object S is independent, the magnetic path is unlikely to be affected by a magnetic interference caused by a leakage flux coming from another core, so that the detection sensitivity can be improved.

While, in the above-described embodiment, a pair of insulating tubular bodies 3α, 3β, in which flux linkage surfaces of cores intersect with the detected object S at inclination angles of +45° and −45°, is provided, only at least any one can be provided, or three or more insulating tubular bodies can be provided.

Moreover, a search coil which detects a change in magnetic flux density passing through the core 5 can be wound around the bridging portion 5b of the core 5.

Moreover, while the core 5 is integrally formed from a magnetic material in a U-shape including the two-side leg portions 5a and the bridging portion 5b connecting them, the two-side leg portions 5a can be formed from a magnetic plate material and the bridging portion 5b can be configured with a magnetic cylinder material which is concentrically fitted around the outer circumference of the insulating tubular body 3.

Moreover, the insulating tubular body 3 and the core 5 can be integrally attached by insert molding.

What is claimed is:

1. A magnetostriction type torque detection sensor comprising:
    an insulating tubular body concentrically attached in such a way as to cover an outer circumference of a detected object;
    a plurality of detection coils wound along a groove provided on a circumferential surface of the insulating tubular body; and
    a plurality of cores attached to the insulating tubular body in such a manner that each of the plurality of detection coils passes through a U-shaped space portion surrounded by a bridging portion connecting two-side leg portions,
    wherein the plurality of cores is arrayed while being inclined at a predetermined angle to an axis of the detected object and is attached in such a manner that end surfaces of the two-side leg portions face the detected object via an inner circumferential surface of the insulating tubular body.

2. The magnetostriction type torque detection sensor according to claim 1, wherein the plurality of cores is attached to the insulating tubular body in such a manner that a magnetic path which is formed at the plurality of cores and the detected object is at an inclination angle of any one of ±45° to the axis of the detected object.

3. The magnetostriction type torque detection sensor according to claim 2, wherein a first insulating tubular body to which the plurality of cores is attached in such a manner that a magnetic path which is formed at the detected object is formed at an inclination angle of +45° to the axis of the detected object and a second insulating tubular body to which the plurality of cores is attached in such a manner that a magnetic path which is formed at the detected object is formed at an inclination angle of −45° to the axis of the detected object are located close to each other in an axial direction.

* * * * *